(12) United States Patent
Liu et al.

(10) Patent No.: US 11,930,530 B2
(45) Date of Patent: Mar. 12, 2024

(54) EARLY LBT FAILURE REPORTING FOR MULTI-TTI GRANT FOR SIDELINK COMMUNICATION IN UNLICENSED SPECTRUM

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US); Piyush Gupta, Bridgewater, NJ (US); Sony Akkarakaran, Poway, CA (US); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/341,322

(22) Filed: Jun. 7, 2021

(65) Prior Publication Data

US 2022/0394761 A1    Dec. 8, 2022

(51) Int. Cl.
*H04W 74/08* (2009.01)
*H04W 72/04* (2023.01)
(Continued)

(52) U.S. Cl.
CPC ... *H04W 74/0808* (2013.01); *H04W 72/0453* (2013.01); *H04W 72/21* (2023.01); *H04W 74/004* (2013.01)

(58) Field of Classification Search
CPC .......... H04L 1/1854; H04L 2001/0092; H04L 5/001; H04L 5/0026; H04L 5/0033;
(Continued)

(56) References Cited

U.S. PATENT DOCUMENTS

2020/0127796 A1*  4/2020  Li .................... H04L 1/1812
2022/0022252 A1*  1/2022  Lee ................... H04W 76/18
(Continued)

OTHER PUBLICATIONS

"3rd Generation Partnership Project; Technical Specification Group Radio Access Network; Study on NR-Based Access to Unlicensed Spectrum (Release 16)", 3GPP Draft, 3GPP TR 38.889 V16.0.0 (Dec. 2018), 38889-G00, 3rd Generation Partnership Project (3GPP), Mobile Competence Centre, 650, Route Des Lucioles, F-06921 Sophia-Antipolis Cedex, France, Dec. 27, 2018 (Dec. 27, 2018), XP051575597, pp. 1-119, Section 7.2.2.1, p. 51-p. 52, Section 7.2.2.3.1.
(Continued)

*Primary Examiner* — Awet Haile
(74) *Attorney, Agent, or Firm* — Patterson & Sheridan, L.L.P/Qualcomm Incorporated

(57) ABSTRACT

Certain aspects of the present disclosure provide a method for wireless communications by a transmitter UE. The method generally includes receiving, from a network entity, a downlink control information (DCI) allocating resources in an unlicensed frequency band for multiple physical sidelink shared channel (PSSCH) transmissions to at least one receiver UE across transmission time intervals (TTIs), performing a listen-before-talk (LBT) channel access procedure in the TTIs, and transmitting at least one LBT report to the network entity on a physical uplink control channel (PUCCH) resource that occurs before another PUCCH resource used for transmitting acknowledgment feedback for the PSSCH transmissions.

30 Claims, 17 Drawing Sheets

(51) Int. Cl.
*H04W 72/0453* (2023.01)
*H04W 72/21* (2023.01)
*H04W 74/00* (2009.01)

(58) Field of Classification Search
CPC ... H04L 5/0048; H04L 5/0053; H04L 5/0082; H04L 5/0091; H04W 16/14; H04W 24/10; H04W 72/0446; H04W 72/0453; H04W 72/21; H04W 72/23; H04W 74/004; H04W 74/0808; H04W 76/14
See application file for complete search history.

(56) References Cited

U.S. PATENT DOCUMENTS

| | | | | |
|---|---|---|---|---|
| 2023/0129493 | A1* | 4/2023 | Kiilerich Pratas | H04L 5/0057 370/235 |
| 2023/0164835 | A1* | 5/2023 | Ganesan | H04W 74/0808 370/329 |
| 2023/0180291 | A1* | 6/2023 | Du | H04L 1/1893 370/329 |
| 2023/0354416 | A1* | 11/2023 | Kim | H04W 74/0808 |

OTHER PUBLICATIONS

Fraunhofer HHI, et al., "Resource Allocation for Mode 1 NR V2X", 3GPP Draft, 3GPP TSG RAN WG1 #99, R1-1912288, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051819982, pp. 1-16, box, p. 1 section 3.2, p. 9-p. 10, paragraph [0002]—paragraph [0005].
International Search Report and Written Opinion—PCT/US2022/026035—ISA/EPO—dated Aug. 3, 2022.

* cited by examiner

EARLY LBT FAILURE REPORTING FOR MULTI-TTI GRANT FOR SIDELINK COMMUNICATION IN UNLICENSED SPECTRUM

FIELD OF THE DISCLOSURE

Aspects of the present disclosure relate to wireless communications, and more particularly, to techniques for sidelink communications.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved acknowledgment feedback transmission for sidelink communications.

Certain aspects of the subject matter described in this disclosure can be implemented in a method for wireless communications by a transmitter user equipment (UE). The method generally includes receiving, from a network entity, a downlink control information (DCI) allocating resources in an unlicensed frequency band for multiple physical sidelink shared channel (PSSCH) transmissions to at least one receiver UE across transmission time intervals (TTIs), performing a listen-before-talk (LBT) channel access procedure in the TTIs, and transmitting at least one LBT report to the network entity on a physical uplink control channel (PUCCH) resource that occurs before another PUCCH resource used for transmitting acknowledgment feedback for the PSSCH transmissions.

Certain aspects of the subject matter described in this disclosure can be implemented in a method for wireless communications by a network entity. The method generally includes transmitting, to a transmitter user equipment (UE), a downlink control information (DCI) allocating resources in an unlicensed frequency band for multiple physical sidelink shared channel (PSSCH) transmissions to at least one receiver UE across transmission time intervals (TTIs) and receiving at least one LBT report from the transmitter UE on a physical uplink control channel (PUCCH) resource that occurs before another PUCCH resource used for transmitting acknowledgment feedback for the PSSCH transmissions.

Certain aspects of the subject matter described in this disclosure can be implemented in a transmitter user equipment (UE). The transmitter UE generally includes a receiver configured to receive, from a network entity, a downlink control information (DCI) allocating resources in an unlicensed frequency band for multiple physical sidelink shared channel (PSSCH) transmissions to at least one receiver UE across transmission time intervals (TTIs), a processing system configured to perform a listen-before-talk (LBT) channel access procedure in the TTIs, and a transmitter configured to transmit at least one LBT report to the network entity on a physical uplink control channel (PUCCH) resource that occurs before another PUCCH resource used for transmitting acknowledgment feedback for the PSSCH transmissions.

Certain aspects of the subject matter described in this disclosure can be implemented in a network entity. The network entity generally includes a transmitter configured to transmit, to a transmitter user equipment (UE), a downlink control information (DCI) allocating resources in an unlicensed frequency band for multiple physical sidelink shared channel (PSSCH) transmissions to at least one receiver UE across transmission time intervals (TTIs), and a receiver configured to receive at least one LBT report from the transmitter UE on a physical uplink control channel (PUCCH) resource that occurs before another PUCCH resource used for transmitting acknowledgment feedback for the PSSCH transmissions.

Aspects of the present disclosure provide UEs, network entities, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
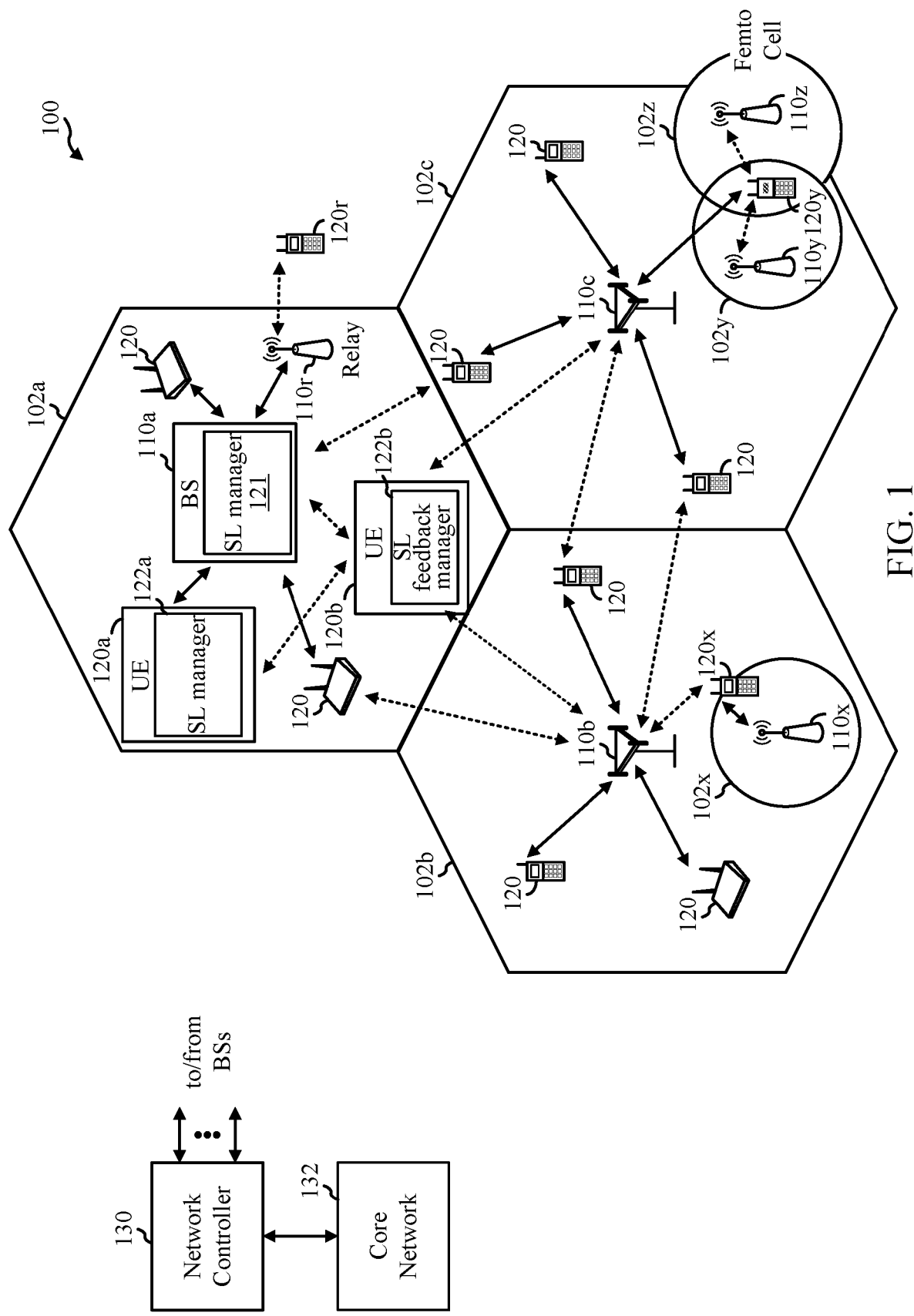
FIG. 1 is a block diagram conceptually illustrating an example telecommunications system, in accordance with certain aspects of the present disclosure.

Aspects of the present disclosure relate to wireless communications, and more particularly, to techniques for scheduling multiple sidelink transmissions in unlicensed spectrum.

In New Radio (NR), a user equipment (UE) may exchange sidelink data (e.g., user data and control signaling) with other UEs directly and without the help (e.g., relaying) of a base station. This type of sidelink communication is often called peer-to-peer (also referred to as device-to-device or D2D) communication. An example of peer-to-peer communication includes vehicle to everything (V2X) communication where a vehicle may communicate with another vehicle (V2V) or a different device, such as a base station, a traffic control system, or the like.

For sidelink communications, resources may be allocated differently in different modes. In a first mode, Mode 1 sidelink communication, the sidelink resources are often scheduled by a gNB. In a second mode, Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

When operating in Mode 1, in an unlicensed spectrum (NR-Unlicensed or NR-U) the gNB assigns orthogonal resources for transmitter UEs for their transmissions. In unlicensed spectrum, however, the transmitter UE still has to perform a listen before talk (LBT) procedure before transmitting. In the event of failure of the LBT procedure, the transmitter UE may need an additional DCI grant from gNB, resulting in additional control signal overhead and extra delay. Aspects of the present disclosure may help address this potential LBT issue for gNB based scheduling or NR-U sidelink transmissions in Mode 1.

The following description provides examples of scheduling multiple sidelink transmissions with a single grant, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 is a block diagram conceptually illustrating an example wireless communication network 100, in which certain aspects of the present disclosure may be practiced. For example, the wireless communication network 100 may include UEs 120a and 120b that include, among other modules/managers, sidelink (SL) managers 122a and 122b, respectively, configured to perform operations 1000 of FIG. 10. Similarly, the wireless communication network 100 may include a BS 110a that includes, among other modules/managers, an SL manager 121, configured to perform operations 1100 of FIG. 11.

Wireless communication network 100 may be, for example, an NR system (e.g., a 5G NR network). As shown in FIG. 1, the wireless communication network 100 may be in communication with a core network 132. The core network 132 may in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
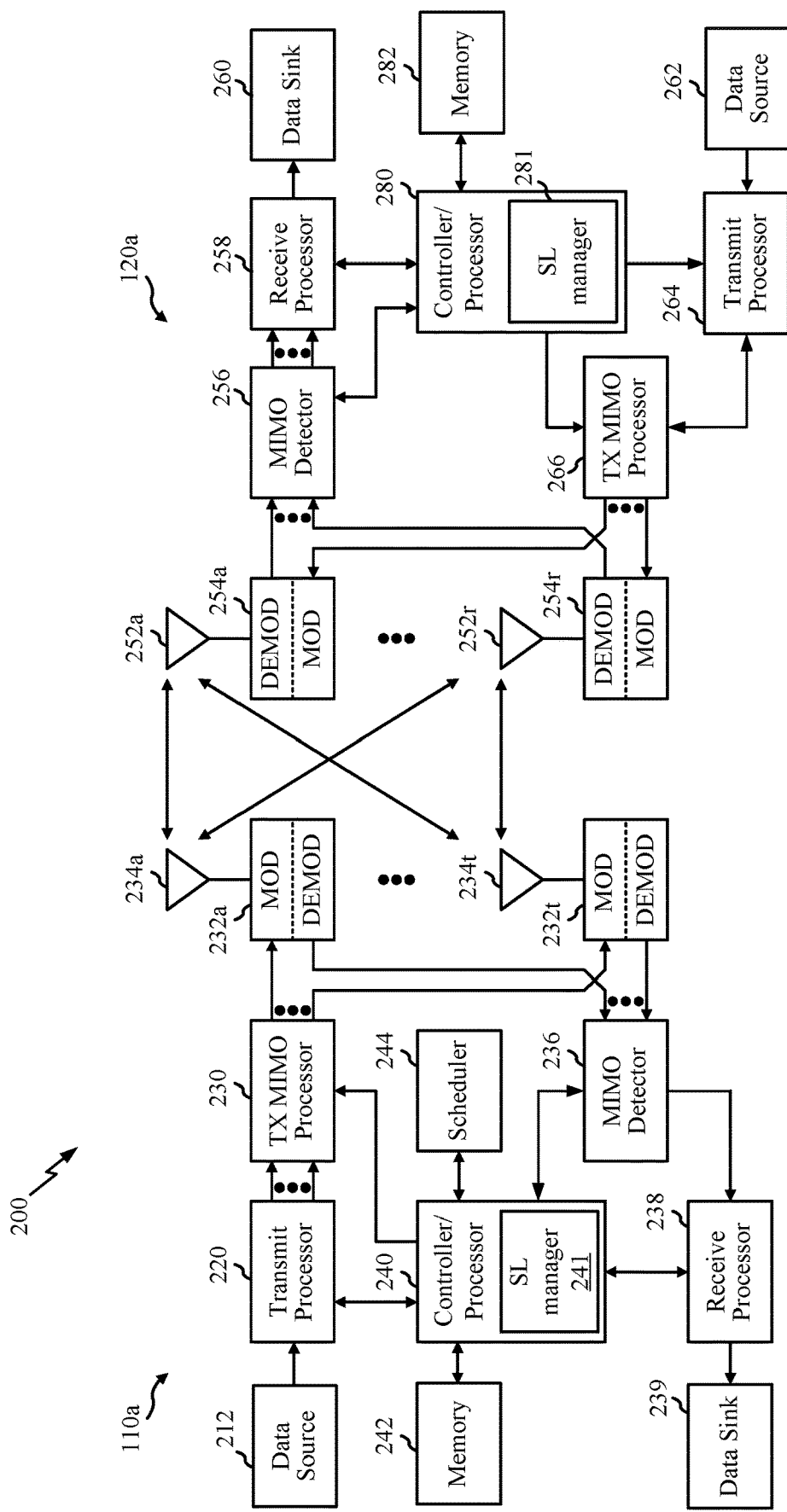
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a may have an SL manager 281 configured to perform operations 1000 of FIG. 10. Similarly, as shown in FIG. 2, the controller/processor 240 of the BS 110a may have an SL manager 241 configured to perform operations 1100 of FIG. 11. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
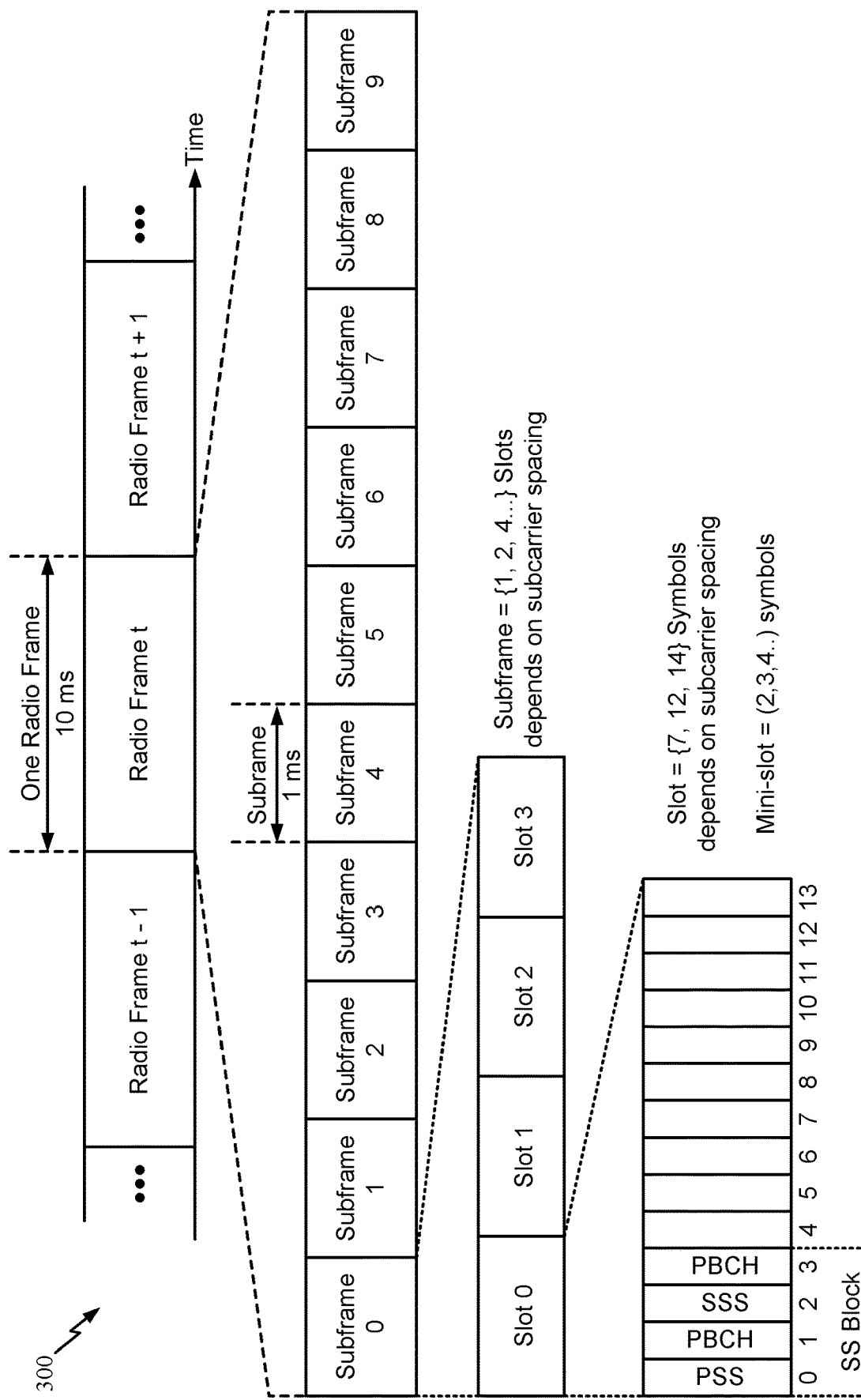
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, while the SS may provide the CP length and frame timing. The PSS and SSS may provide the cell identity. The PBCH carries some basic system information, such as downlink system bandwidth, timing information within radio frame, SS burst set periodicity, system frame number, etc.

The SSBs may be organized into SS bursts to support beam sweeping. Further system information, such as remaining minimum system information (RMSI), system information blocks (SIBs), other system information (OSI) may be transmitted on a physical downlink shared channel (PDSCH) in certain subframes. The SSB may be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets may be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a, as shown in FIG. 1) to another subordinate entity (e.g., UE 122a UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling, such as sidelink resource configurations and other parameters used for data transmissions, and the PSSCH may carry the data transmissions. The PSFCH may carry sidelink feedbacks, such as distance-based and/or non-distancebased HARQ feedbacks related to data transmissions between two or more UEs that are in direct communication with each other.

Figures 4A, 4B:
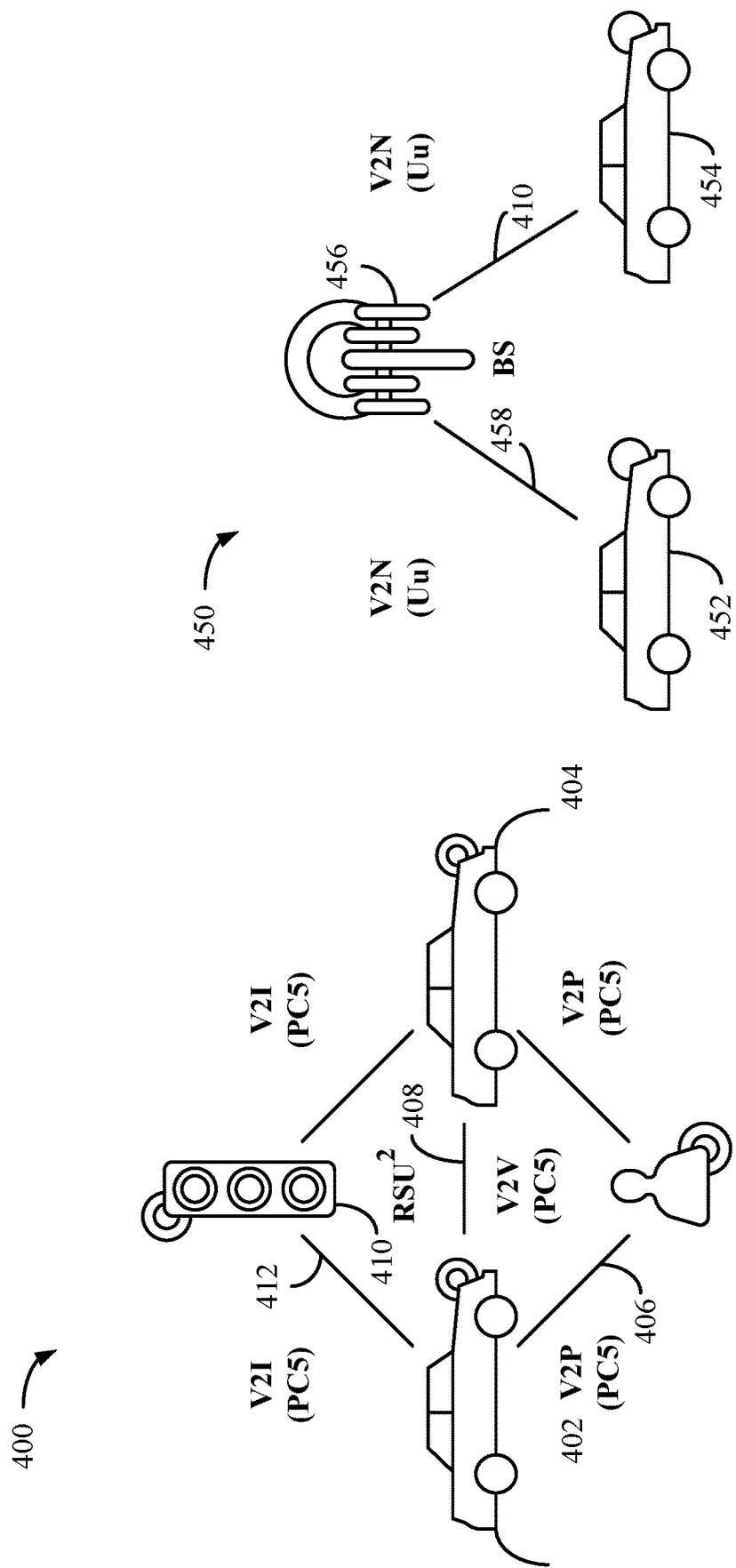
FIG. 4A and FIG. 4B illustrate diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may perform data transmissions via sidelink channels and may receive sidelink feedbacks regarding those data transmissions, as described herein.

The V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, or traffic light 410) may implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a V2X system 400 (e.g., vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (e.g., with a mobile phone of the individual) through a PC5 interface. Communications between the vehicles 402 and 404 may also occur through a PC5 interface 408. In a like manner, communication may occur from a vehicle 402 to other highway components (e.g., highway component 410), such as a traffic signal or sign (V2I) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a BS (e.g., the BS 110a shown in FIG. 1), that sends and receives information to and from (or relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Example Mode 1 Multi-TTI Grant for Sidelink Communication in Unlicensed Spectrum Aspects of the present disclosure relate to wireless communications, and more particularly, to techniques for scheduling multiple sidelink transmissions in unlicensed spectrum.

Current cellular V2X communication designs target deployments in licensed spectrum. Such designs typically either share spectrum in a licensed cellular band or dedicated ITS (intelligent transportation system) spectrum. In the licensed cellular spectrum, V2X systems share uplink spectrum in a cellular network. In dedicated ITS spectrum there are spectrums around 5.9 GHz allocated for V2X in some regions.

The dedicated spectrum is not guaranteed in some regions due to scarcity of spectrum. For example, in some areas/countries, there is dedicated spectrum allocated for LTE V2X (specified in LTE Release-14 and Release-15), but no spectrum available for NR V2X (specified in NR Release-16 targeting advanced V2X use cases like autonomous driving).

As a result, it is likely that cellular V2X communications will be deployed in unlicensed spectrum, given that it might be the only option in some regions. However, unlicensed spectrum may be shared by other technologies like Wi-Fi. For this reason, use of unlicensed spectrums is typically subject to various regulatory requirements depending on the region. One of the requirements is listen before talk (LBT): which mandates that a device only transmits (talk) in an unlicensed channel if the channel is sensed (by listening) to be free.

LBT is a form of a clean channel assessment (CCA) procedure that typically involves measuring energy or power in the channel for a certain duration of time. Exactly when devices transmit may depend on a particular category of LBT. For a category 2 (CAT 2) LBT, the device transmits if the CCA indicates the channel is free; e.g., Type 2 channel access procedures as specified in 3GPP. For a category 4 (CAT 4) LBT, the device performs random back-off within a contention window (extended CCA) if CCA indicates the channel is free, and transmits only when channel is still free during the back-off period; e.g., Type 1 channel access procedures as specified in 3GPP.

Figure 5:
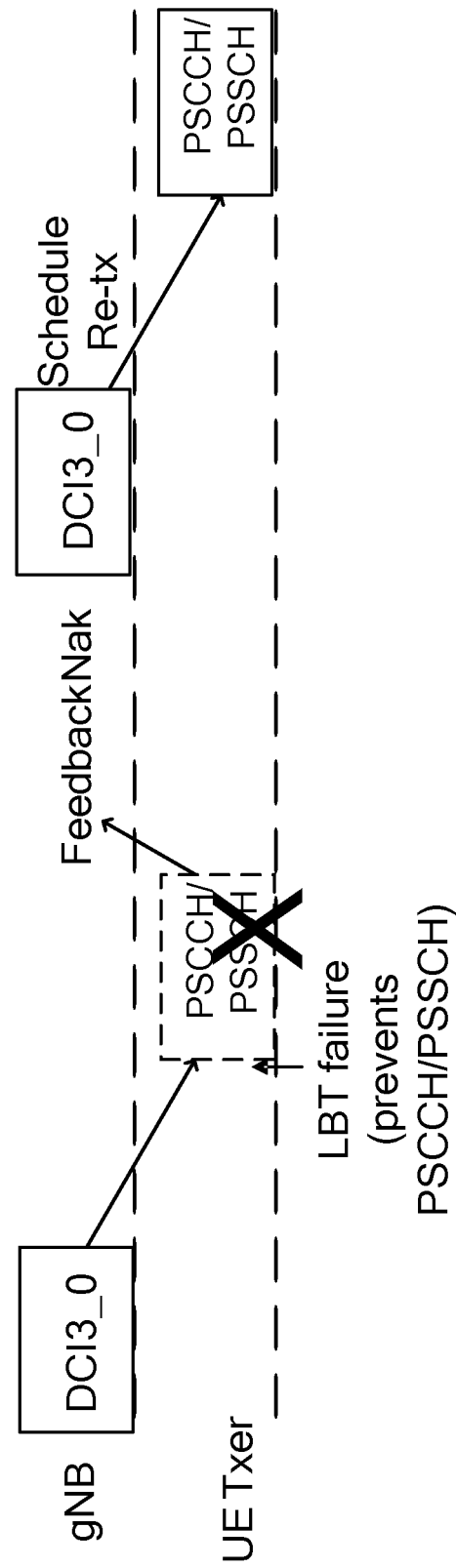
FIG. 5 illustrates an example listen before talk (LBT) scenario for sidelink communications.

As noted above, when operating in Mode 1 with gNB allocating resources in an unlicensed spectrum is that the transmitter UE still has to perform an LBT procedure before transmitting. This scenario is illustrated in FIG. 5, in which a gNB sends a grant to a transmitter UE for a single SL transmission, via a DCI. The transmitter UE performs an LBT to ensure the channel is free before sending the SL transmission. As illustrated, in the event of failure of the LBT procedure, it may send a negative acknowledgment (NAK) feedback to the gNB, indicating the transmitter UE may need an additional DCI grant from gNB, thus resulting in additional control signal overhead and extra delay.

Aspects of the present disclosure may help address this potential LBT issue for gNB based scheduling or NR-U sidelink transmissions in Mode 1. For example, the techniques proposed herein may enable multi-TTI scheduling in Mode 1 for a SL Transmitter UE to transmit multiple TBs, via a single downlink control information (DCI, such as DCI format 3_0). This may allow a transmitter UE to still transmit, even in the event an LBT procedure for one of the scheduled transmission fails, which may help reduce signaling overhead and reduce delay.

Example LBT Reporting

Unfortunately, conventional acknowledgment feedback for sidelink communications sometimes lacks information that could be useful.

Figure 6A:
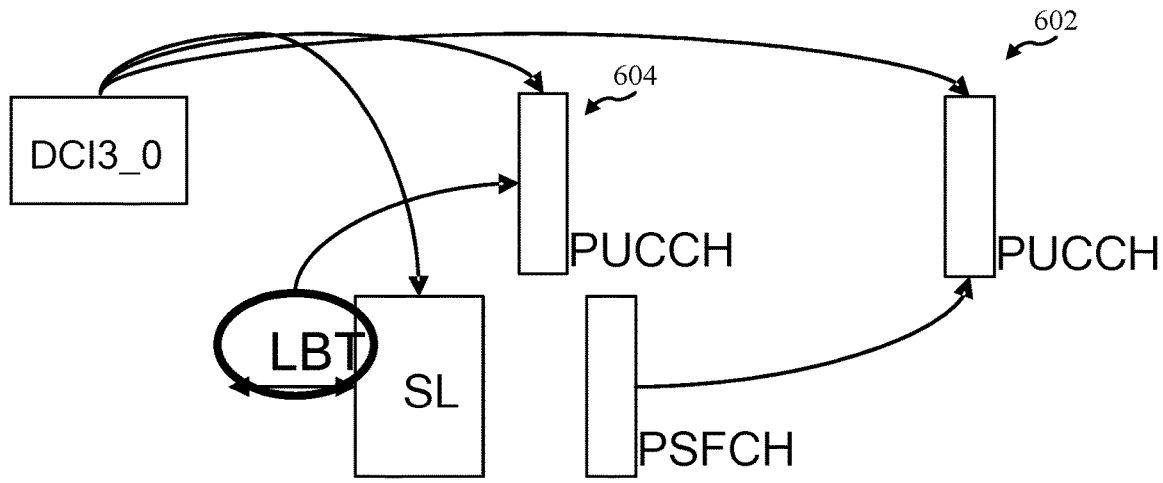
FIGS. 6A and 6B illustrate example LBT and acknowledgment feedback scenarios for sidelink communications.

For example, referring to FIG. 6A, in unlicensed SL Mode 1 operation, a negative acknowledgment (NACK) conveyed via a PUCCH 602 does not reflect whether the NACK is due to an LBT failure (the UE did not pass LBT in a scheduled slot) or a decoding failure (the LBT passed, but the scheduled transmission failed).

As shown in FIG. 6A, in a (Release 16) SL Mode 1 design, the PUCCH 602 granted by DCI 3_0 is typically located, in time, assuming that the scheduled PSSCH is transmitted and the corresponding PSFCH (which indicates success/failure of the PSSCH transmission(s)) is received.

In some cases, however, an early PUCCH resource 604 may be provided for LBT failure reporting so that gNB rescheduling delay can be minimized. This LBT failure reporting may be referred to as early because the PUCCH resource 604 occurs in time before the PSFCH is received (and before the PUCCH resource 602 used to provide acknowledgment feedback for the PSSCH transmission(s)). In some cases, a separate PUCCH resource indication (PRI) and/or scheduling offset (e.g., a K1 parameter) may be provided for such early L1 LBT reporting. In some cases, a separate sidelink assignment index (SAI) may be provided for an LBT report codebook.

Figure 6B:
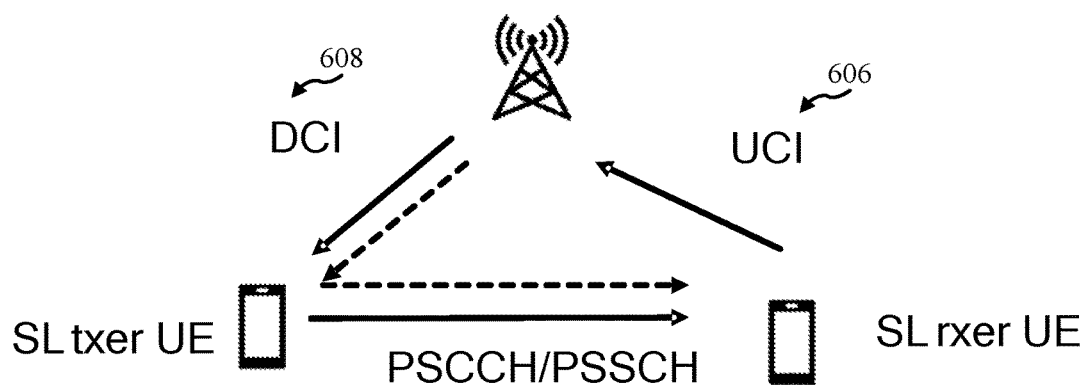

In some cases, as shown in FIG. 6B, a receiver UE (Rxer) may directly report ACK/NACK feedback to a gNB via uplink control information (606) carried via a PUCCH resource. In some cases, the gNB may send the transmitter UE (Txer) a DCI that indicates PUCCH resources for the Rx UE to use for sending the ACK/NACK feedback directly to the gNB. In such cases, the Tx UE may forward (tunnel) this PUCCH resource assignment to the receiver UE (to start collecting HARQ responses) via SCI.

In some cases, a multi-TTI scheduling DCI (e.g., DCI3_0) may be used in mode 1 to allow a SL transmitter UE (Txer) to transmit multiple TB with a single grant to save DCI signaling for bursty traffic and address the LBT uncertainty (by allowing multiple opportunities for the Txer to pass LBT).

In some cases, a Sidelink Assignment Index (SAI) mechanism may be enhanced t when supporting multi-TTI SL grants. The SAI mechanism may allow PSFCH-to-HARQ feedback timing indication for dynamic type-2 HARQ codebook enhancement for multi-TTI grant.

Sidelink Assignment Indexes (SAIs) refer to a mechanism that helps track a number of scheduled sidelink transmissions (PSSCHs). An SAI counter may facilitate detecting a missing DCI detection. This may allow a transmitter UE to know how may transmissions a scheduling gNB is expecting, so it may feedback an appropriate number of bits. In some cases, this may mean the sidelink transmitter UE performs padding (adding additional bits to account for missing DCI) for HARQ feedback (e.g., if using an SL type-2 HARQ codebook). For example, the transmitter UE may have to pad PUCCH carrying the feedback, so the payload size is as expected by the gNB. The number of bits may be defined based on the PDCCH monitoring instance.

Figure 7:
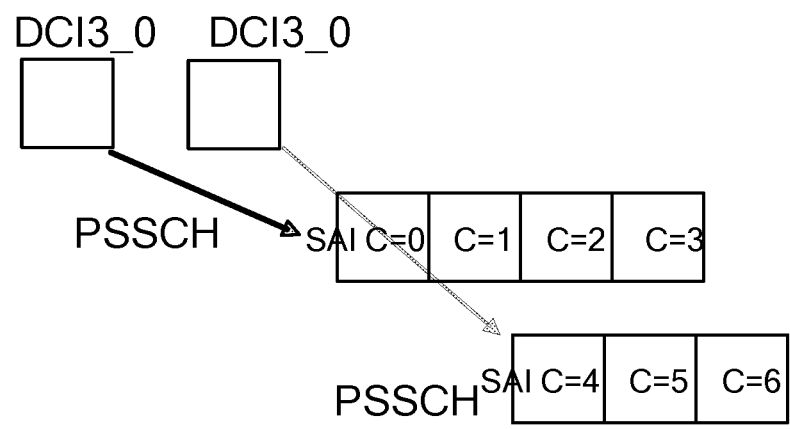
FIG. 7 illustrates an example timeline for scheduling multiple sidelink retransmissions, in accordance with certain aspects of the present disclosure.

For example, as illustrated in FIG. 7, a DCI for multi-TTI SL grants (e.g., DCI 3_x) may indicate the SAI value for the first PSSCH, and the following PSSCHs may assume incremental SAI values based on one or more predefined rules. In this manner, there may be no need for an explicit SAI field for the later PSSCHs (after the initial PSSCH) and the SAI values may be derived based on the rules. For example, the SAI value of the n-th PSSCH after the $1^{st}$ scheduled PSSCH may assume to be $SAI_{1st}+(n-1)$.

In this case, the next multi-TTI SL DCI could increase the SAI based on the last SAI associated with the last PSSCH in the previous (multi-TTI) DCI grant. For example, referring again to FIG. 7, if the first DCI indicates SAI=0 for the first PSSCH in a burst of 4 PSSCH transmissions, the next DCI may indicate SAI=4 for the first PSSCH in a subsequent burst of 3 PSSCH transmissions.

Figure 8:
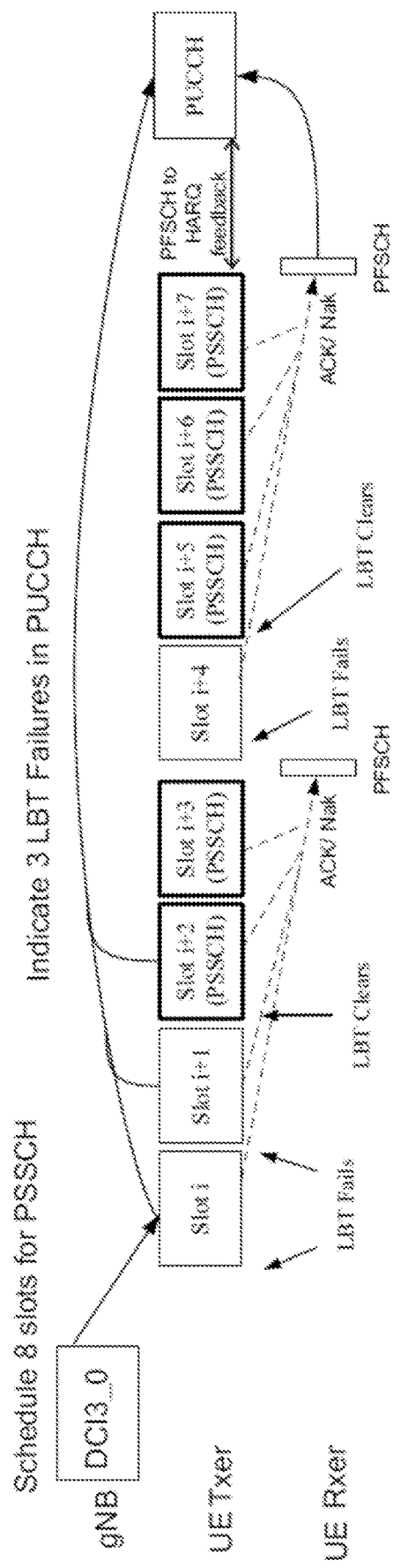
FIG. 8 illustrates an example LBT feedback scenario for sidelink communications.

In some cases, as illustrated in FIG. 8, LBT reporting may also be used for multi-TTI grant scenarios. In this case, a PUCCH resource 802 may be provided to convey an LBT report. The LBT report can carry an LBT failure pattern or percentage of LBT failure among multiple granted slots, which may help the MAC or upper layer to make a subchannel selection.

Figure 9:
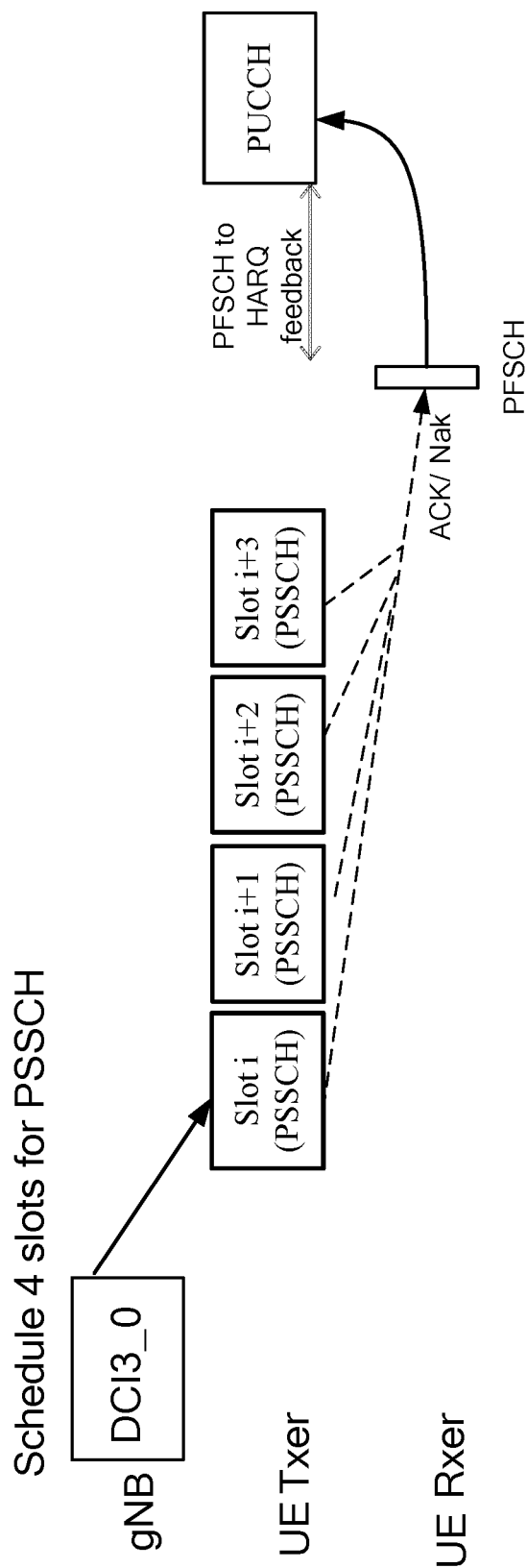
FIG. 9 illustrates an example acknowledgment feedback scenario for sidelink communications.

As illustrated in FIG. 8, for SL multi-TTI grants, the Txer attempts to clear LBT sequentially at the beginning of the scheduled slots until it succeeds, and transmits in the rest of the scheduled slots in a burst without LBT. As illustrated in FIG. 8 and also in FIG. 9, there may be a single PUCCH resource assigned for the A/N reporting for all the scheduled slots. In some cases, it may be of the interest of upper layer to learn how many tries of LBT are needed to clear the LBT for a particular sub-band, not because of SL transmission failed reception (contiguous resource pool) or a percentage of LBT failure. As noted above, the LBT report may assist in making the LBT subband selection in MAC or upper layer. In some cases, the multi-TTI grant assigns the same subbands for the scheduled slots. In such cases, the MAC layer may make smarter scheduling decision based on prior LBT reports.

Example Early LBT Report for Multi-TTI Grant for Sidelink Communication in Unlicensed Spectrum As noted above, a Multi-TTI grant may schedule a long burst of PSSCH transmission. However, the associated PUCCH resource for conventional ACK/NACK feedback is after the end of the burst. In the case of LBT failure at the beginning of the burst, it might be desirable to enable the gNB to reschedule the LBT failed PSSCH transmissions before the end of the burst, in order to reduce the latency.

While an early LBT report, at earlier PUCCH resources may be helpful, it may be a challenge for a multi-TTI grant is how to convey various information (e.g., K1/PRI/SAI fields) independently for each slot for each slot.

Aspects of the present disclosure provide an early LBT report for multiple slots scheduled by a multi-TTI grant. This early LBT report may allow the gNB to make retransmission preparation and scheduling decisions before the combined (for all scheduled slots) ACK/NACK reports that are not sent until after the last PFSCH. As will be described in greater detail below, LBT reports for multi-TTI grants may report LBT outcomes in groups on different PUCCH resources.

Figure 10:
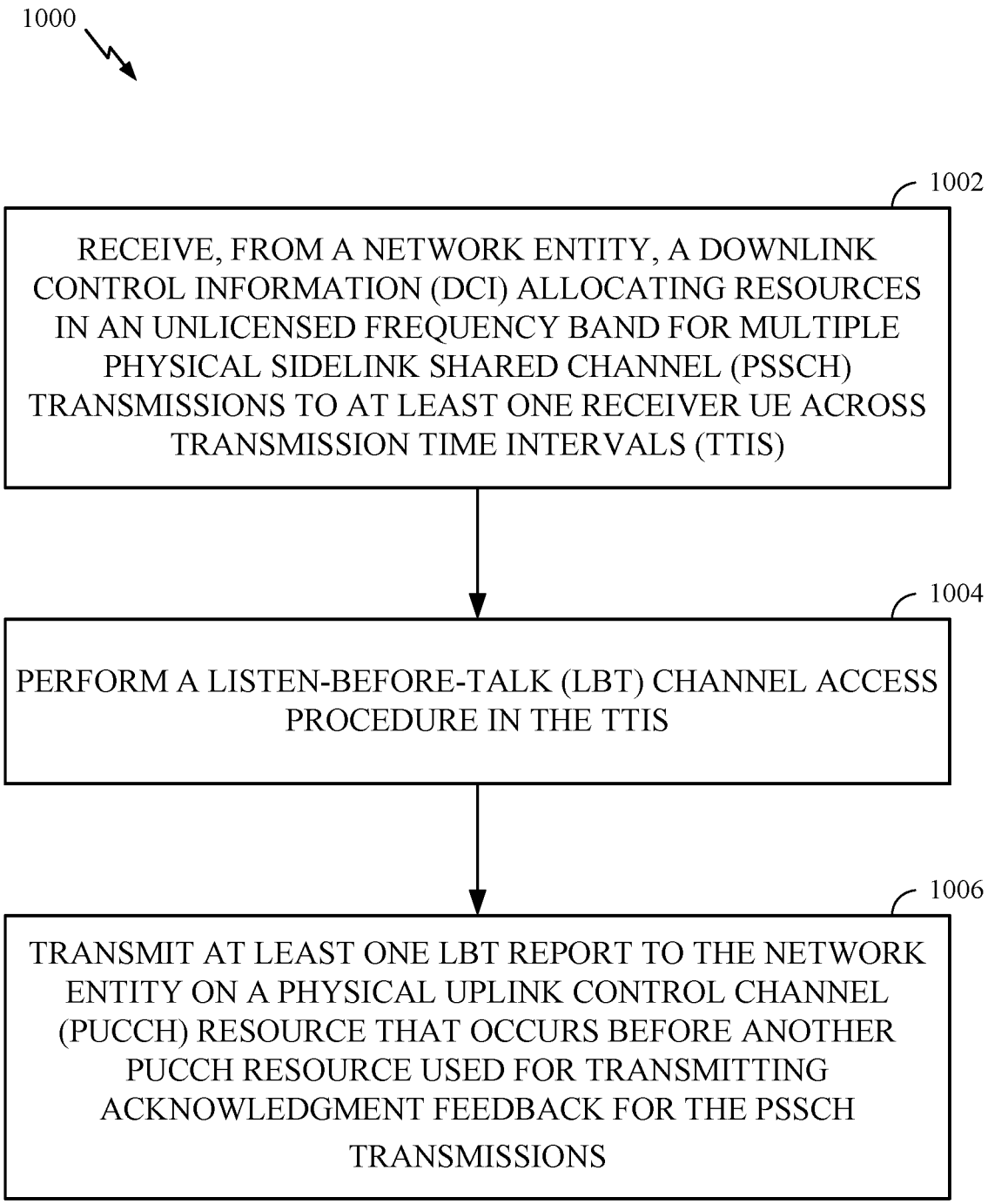
FIG. 10 illustrates example operations for wireless communications by a transmitter user equipment (UE), in accordance with certain aspects of the present disclosure.
Figure 11:
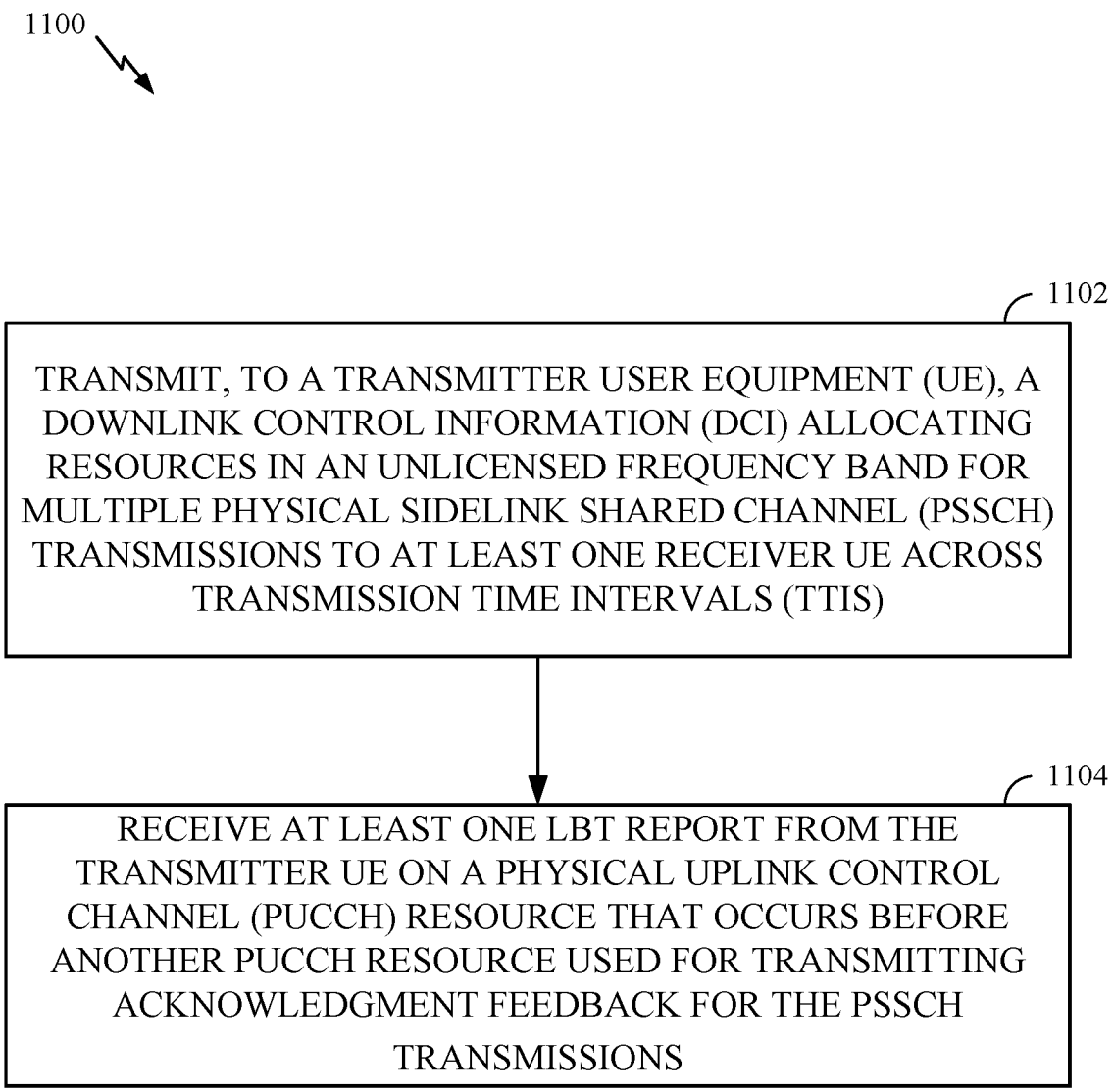
FIG. 11 illustrates example operations for wireless communications by a network entity, in accordance with certain aspects of the present disclosure.

FIGS. 10 and 11 illustrate operations 1000 and 1100 for processing multi-TTI SL transmissions, from a Tx UE and network entity (e.g., gNB) perspective, respectively. These operations may be understood with reference to the example timeline shown in FIG. 12.

FIG. 10 illustrates example operations 1000 for wireless communications by a transmitter UE, in accordance with certain aspects of the present disclosure. Operations 1000 may be performed, for example, by a Tx UE (e.g., such as UE 120a in the wireless communication network 100, as shown in FIG. 1) to transmit sidelink data and signal a receiver UE whether resources are available for acknowledging the data.

Operations 1000 begin, at 1002, by receiving, from a network entity, a downlink control information (DCI) allocating resources in an unlicensed frequency band for multiple physical sidelink shared channel (PSSCH) transmissions to at least one receiver UE across transmission time intervals (TTIs).

Figure 12:
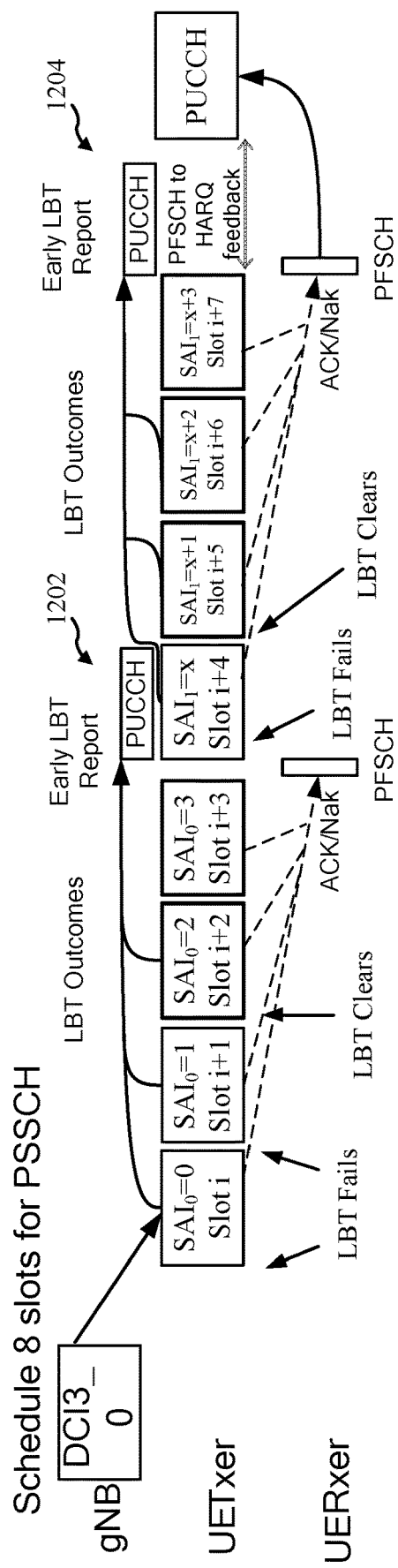
FIG. 12 illustrates an example early LBT feedback scenario for sidelink communications, in accordance with certain aspects of the present disclosure.

As shown in FIG. 12, the DCI may be a DCI format DCI3_0 that indicates time and frequency resources for multiple sidelink transmissions. In the illustrated example, resources are allocated for 8 PSSCH transmissions in consecutive slots (slots i through i+7).

At 1004, the transmitter UE performs a listen-before-talk (LBT) channel access procedure in the TTIs. At 1006, the transmitter UE transmits at least one LBT report to the network entity on a physical uplink control channel (PUCCH) resource that occurs before another PUCCH resource used for transmitting acknowledgment feedback for the PSSCH transmissions.

As shown in FIG. 12, the TX UE may send a first early LBT report for the first four slots (slots i through i+3) in a first PUCCH resource 1202. The TX UE may subsequently send a second early LBT report for the last four slots (slots i+4 through i+7) in a second PUCCH resource 1204.

FIG. 11 illustrates example operations 1100 that may be considered complementary to operations 1000 of FIG. 10. For example, operations 1100 may be performed by a BS 110 of FIG. 1 (e.g., a gNB) to schedule a UE (performing operations 1000 of FIG. 10) for sidelink transmissions across multiple TTIs.

Operations 1100 begin, at 1102, by transmitting, to a transmitter user equipment (UE), a downlink control information (DCI) allocating resources in an unlicensed frequency band for multiple physical sidelink shared channel (PSSCH) transmissions to at least one receiver UE across transmission time intervals (TTIs). At 1104, the network entity receives at least one LBT report from the transmitter UE on a physical uplink control channel (PUCCH) resource that occurs before another PUCCH resource used for transmitting acknowledgment feedback for the PSSCH transmissions.

In some cases, the multi-TTI scheduled PSSCH transmissions may be divided into groups for LBT outcome reporting (referred to herein as LBT reporting groups) and each group may map to a separate PUCCH resource.

Figure 13:
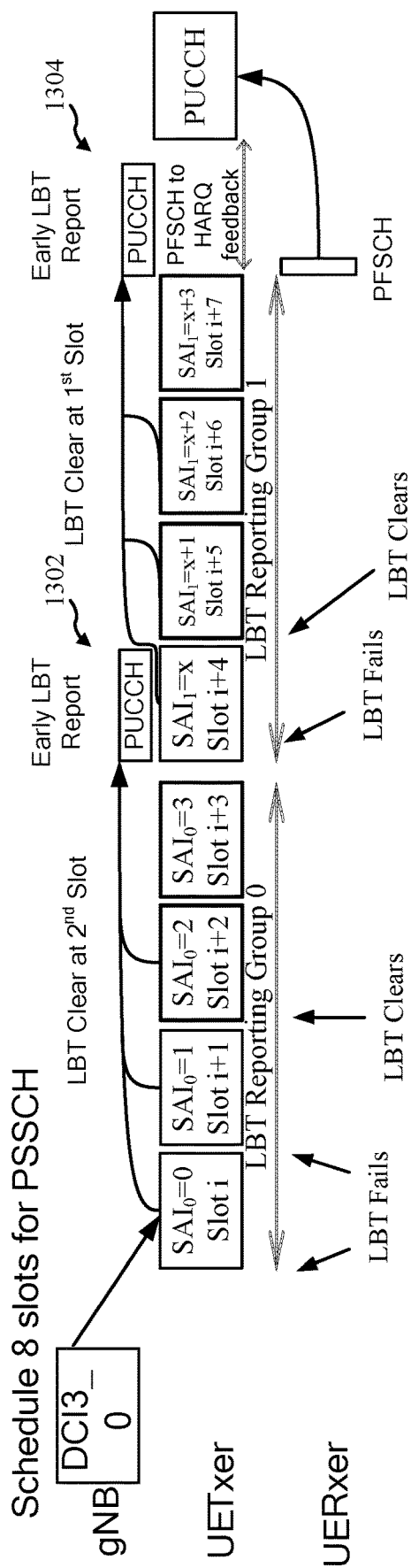
FIG. 13 illustrates another example early LBT feedback scenario for sidelink communications, in accordance with certain aspects of the present disclosure.

For example, as illustrated in FIG. 13, scheduled slots may be divided into a predetermined number of group with contiguous slots. In the illustrated example, 8 scheduled slots are divided into two LBT reporting groups: LBT reporting group 0 with slots i through i+3 and LBT reporting group 1 with slots i+4 through i+7. As illustrated, each group has an associated PUCCH resource for early LBT reporting (PUCCH resource 1302 for LBT reporting group 0 and PUCCH resource 1304 for LBT reporting group 1).

The DCI (DCI3_x) multi-TTI grant may include information, such as K1 and/or PRI for each of the groups. K1 for early LBT reporting PUCCH resource may be with respect to the last slot of the associated group. To save on DCI payload, the following options are possible for conveying the K1 and PRI information:

Option 1: common K1/PRI for all the groups;
Option 2: common K1 for all the groups and separate PRI for each group; or
Option 3: Separate K1 and PRI for each group.

For a type-2 LBT reporting codebook, an independent counter SAI may be introduced for each group. This early LBT reporting SAI may be separate from the ACK/NACK SAI. In some cases, the LBT counter SAI value provided in the multi-TTI DCI may indicate the counter value of the $1^{st}$ slot in the corresponding group. Assuming each slot contributes one LBT outcome bit, incremental virtual SAI values may be assumed for the later slots within the group. For example, referring back to FIG. 12, the first $SAI_i$ for the first slot in a group is the SAI indicated in DCI for group i and the remaining $SAI_i$'s are the virtual SAI derived therefrom. In the illustrated example, $SAI_0=0$ is signaled in DCI for LBT reporting group 0, while the remaining SAI values $SAI_0=1$, $SAI_0=2$, and $SAI_0=3$ are derived. Similarly, $SAI_1=x$ is signaled in DCI for LBT reporting group 1, while the remaining SAI values $SAI_1=x+1$, $SAI_1=x+2$, and $SAI_1=x+3$ are derived.

Each early LBT report may convey an LBT outcome bitmap for each of the group. In this manner, each report may indicate an exact LBT failing slot index, which may be used for early retransmission. In the example illustrated in FIG. 13, the bitmap for LBT reporting group 0 may indicate LBT fails in slots i and i+1, while the bitmap for LBT reporting group 1 may indicate an LBT fail in slot i+4.

Such a signaling mechanism may be applied for discontinuous PSSCH resource pool and may allow for gaps (e.g., gaps between groups). In some cases, such bitmaps may not optimally exploit a correlation of LBT outcomes. In some cases, to save signaling overhead, the LBT clearing slot within a contiguous burst may be indicated. If the LBT report grouping is aligned with a contiguous burst, it may be sufficient to indicate just the first slot which clears the LBT (as the Tx UE may continue to transmit in the remaining slots without performing LBT).

In some cases, each contiguous burst scheduled by the multi-TTI grant may be treated as a group for early LBT reporting. In such cases, the Tx UE may signal the LBT clearing slot index of the group in the associated PUCCH resource. In such cases, the number of LBT outcome bits for each group may be determined by the following equation:

LBT Bits=$\lceil \log_2(1+N_{slot,group_i}) \rceil$, where $N_{slot,group_i}$ is the number of slots within the group. In some cases, for type-2 codebook, the LBT counter SAI value associated with the same PUCCH resource for the next grant may be incremented by the # of LBT outcome bits in the current group.

As noted above, in some cases, the LBT outcome bits may be interpreted as indicating the slot index of the $1^{st}$ slot which clear the LBT within each LBT reporting group. For example, LBT outcome bits '0000' may indicate LBT cleared in the $0^{th}$ slot in the burst, '0001' may indicate LBT cleared in the $1^{st}$ slot in the burst, and so on. In some cases, all ones '1111' could imply that LBT fails in all the slots in the burst.

In some cases, if the Tx UE detects a missed DCI (e.g., based on SAI values), the Tx UE may pad the LBT outcome bits with all ones (implying failing LBT). In some cases, if a scheduled contiguous burst is still too long, that burst may be further split it into multiple LBT reporting groups (e.g., more than 2) and each group has its own PUCCH resource.

Figure 14:
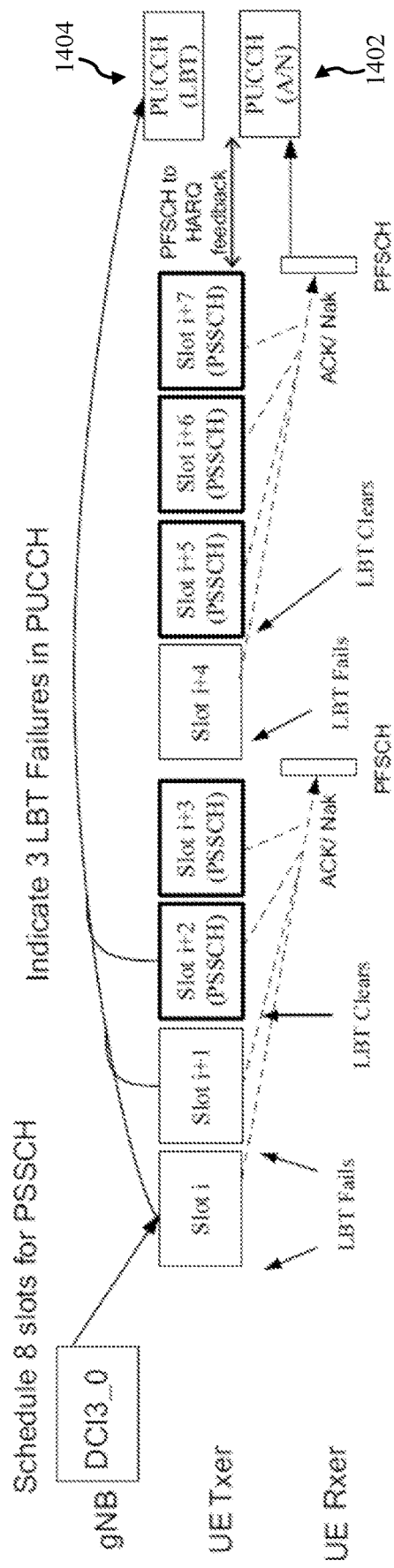
FIG. 14 illustrates an example LBT feedback scenario with acknowledgment feedback from a receiver UE, in accordance with certain aspects of the present disclosure.

As noted above, in some cases, the receiver UE (Rx UE) may be configured to report ACK/NACK directly to the gNB via PUCCH. For example, FIG. 14 illustrates an example where the Rx UE provides ACK/NACK feedback on PUCCH resource 1402. In such a case, the Tx UE may not be assigned any PUCCH for providing ACK/NACK feedback via the Uu interface. However, the Tx UE may need to be assigned PUCCH resources for reporting the LBT outcome to the gNB. This resource may be sufficient, as only the Tx UE knows if it fails LBT (and, thus, the Rx UE does not know when the Txer will be transmitting PSCCH/PSSCH).

Figure 15:
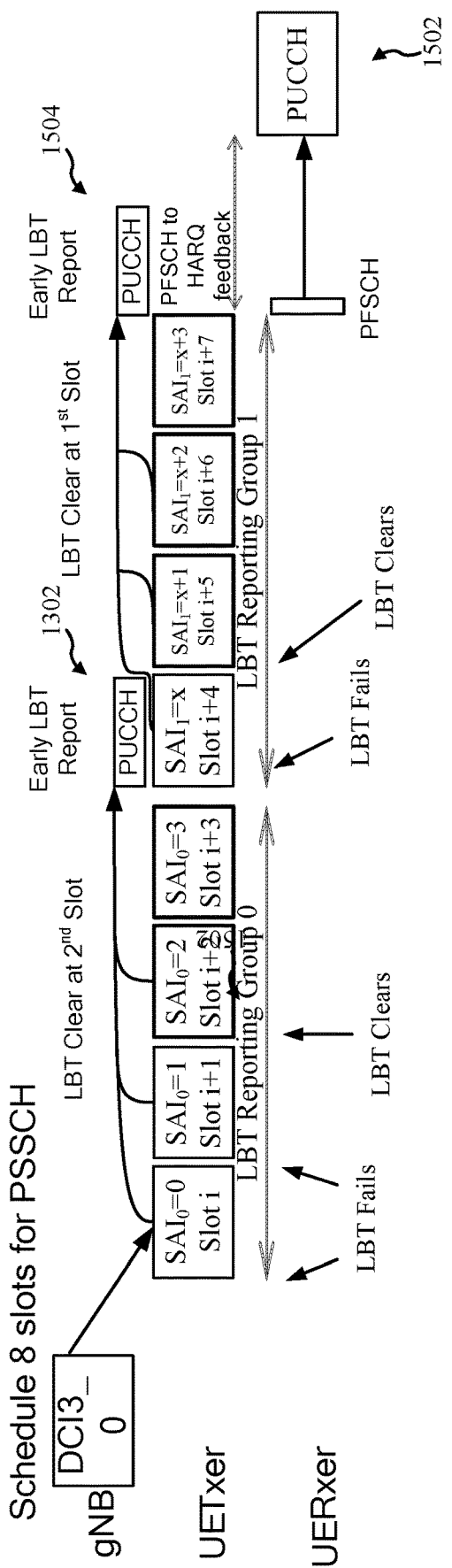
FIG. 15 illustrates an example early LBT feedback scenario with acknowledgment feedback from a receiver UE, in accordance with certain aspects of the present disclosure.

Thus, as illustrated in FIG. 14, in case of a gNB collecting HARQ feedback from the Rx UE, the Tx UE may be assigned a PUCCH resource 1404 (in DCI3_x) in order to transmit the LBT report via PUCCH back to the gNB. While the example shown in FIG. 14 assigns PUCCH resource 1404 for regular LBT reporting at the end of scheduled slots, as illustrated in FIG. 15, additional LBT reporting PUCCH resources 1504 and 1506 may be assigned to the Tx UE for early LBT reporting (before PUCCH 1502 assigned for ACK/NACK feedback by the Rx UE).

In some cases, for the regular (not early) LBT reporting, DCI 3_x may carry SAI, PRI, and K1 for the LBT reporting PUCCH resource. In this case, the K1 value may be relative to the end of the scheduled slots. In such cases, DCI3_x may still carries SAI, PRI and K1, however, with respect to the PFSCH for the Rx UE's PUCCH and the Tx UE may only tunnel the Rx UE's PUCCH resource assignment via the SCI to Rx UE. In other words, the Tx UE's PUCCH resource assignment does not need to be tunneled.

In some cases, for early LBT reporting, the PUCCH resource may be indicated as in the examples described above. Additional PUCCH resource may also be signaled for ACK/NACK from the Rx UE. In some cases, the DCI (DCI3_x) may carry SAI/PRI/K1 for two PUCCH resources, one for PUCCH at the Tx UE for the LBT report and the other one for PUCCH at the Rx UE for ACK/NACK.

Figure 16:
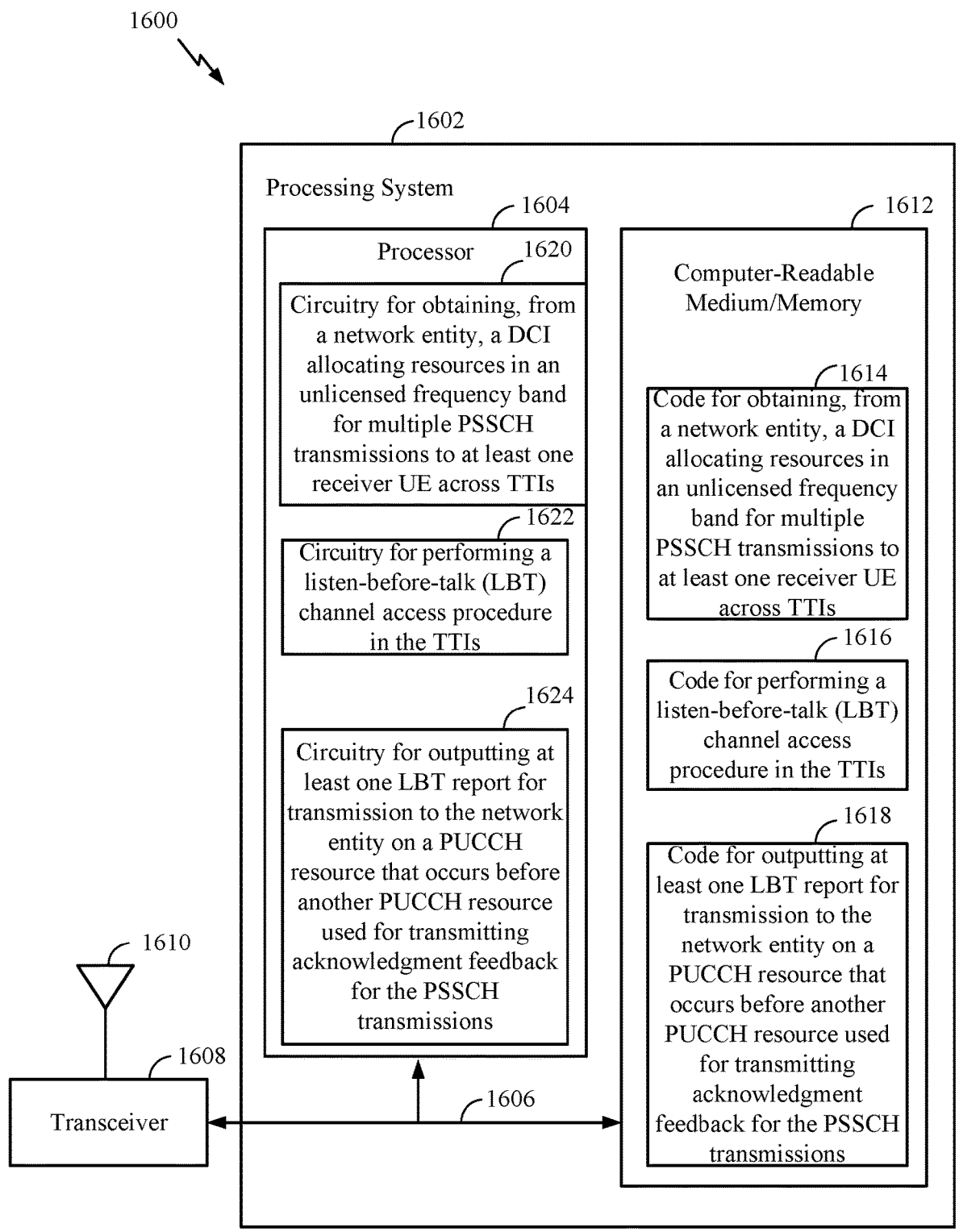
FIG. 16 illustrates a communications device that may include various components configured to perform operations for techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 10. The communications device 1600 may include a processing system 1602 coupled to a transceiver 1608 (e.g., a transmitter and/or a receiver). The transceiver 1608 may be configured to transmit and receive signals for the communications device 1600 via an antenna 1610, such as the various signals as described herein. The processing system 1602 may be configured to perform processing functions for the communication device 1600, including processing signals received and/or to be transmitted by the communications device 1600.

The processing system 1602 may include a processor 1604 coupled to a computer-readable medium/memory 1612 via a bus 1606. In certain aspects, the computer-readable medium/memory 1612 may be configured to store instructions (e.g., computer-executable code) that when executed by the processor 1604, cause the processor 1604 to perform the operations illustrated in FIG. 10, or other operations for performing the various techniques discussed herein. In certain aspects, computer-readable medium/memory 1612 may store code 1614 for obtaining, from a network entity, a downlink control information (DCI) allocating resources in an unlicensed frequency band for multiple physical sidelink shared channel (PSSCH) transmissions to at least one receiver UE across transmission time intervals (TTIs); code 1616 for performing a listen-before-talk (LBT) channel access procedure in the TTIs; and/or code 1618 for outputting at least one LBT report for transmission to the network entity on a physical uplink control channel (PUCCH) resource that occurs before another PUCCH resource used for transmitting acknowledgment feedback for the PSSCH transmissions.

In certain aspects, the processor 1604 may have circuitry configured to implement the code stored in the computer-readable medium/memory 1612. The processor 1604 may include circuitry 1620 for obtaining, from a network entity, a downlink control information (DCI) allocating resources in an unlicensed frequency band for multiple physical sidelink shared channel (PSSCH) transmissions to at least one receiver UE across transmission time intervals (TTIs); circuitry 1622 for performing a listen-before-talk (LBT) channel access procedure in the TTIs; and/or circuitry 1624 for outputting at least one LBT report for transmission to the network entity on a physical uplink control channel (PUCCH) resource that occurs before another PUCCH resource used for transmitting acknowledgment feedback for the PSSCH transmissions.

Figure 17:
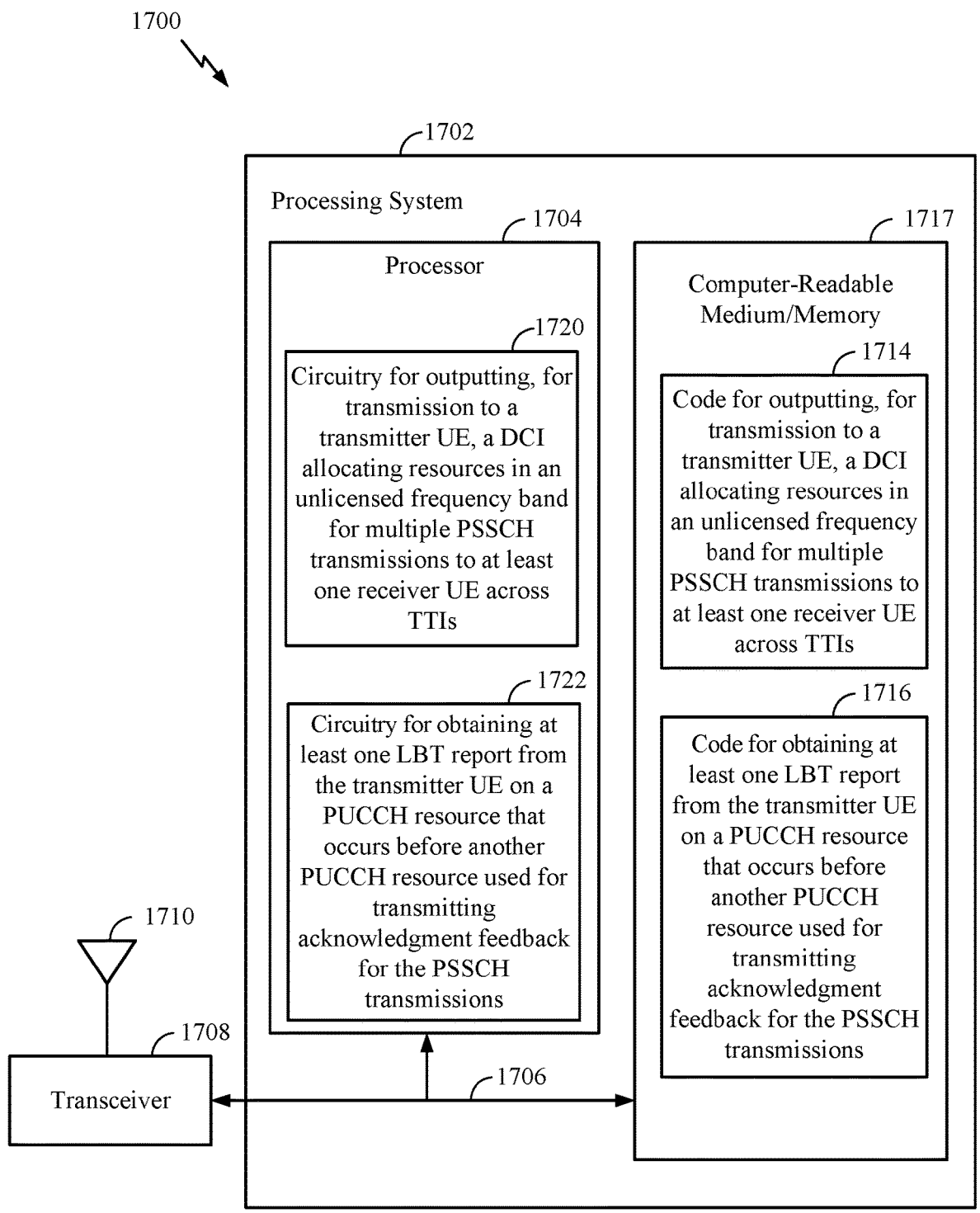
FIG. 17 illustrates a communications device that may include various components configured to perform operations for techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 11. The communications device 1700 may include a processing system 1702 coupled to a transceiver 1708 (e.g., a transmitter and/or a receiver). The transceiver 1708 may be configured to transmit and receive signals for the communications device 1700 via an antenna 1710, such as the various signals as described herein. The processing system 1702 may be configured to perform processing functions for the communication device 1700, including processing signals received and/or to be transmitted by the communications device 1700.

The processing system 1702 may include a processor 1704 coupled to a computer-readable medium/memory 1712 via a bus 1706. In certain aspects, the computer-readable medium/memory 1712 may be configured to store instructions (e.g., computer-executable code) that when executed by the processor 1704, cause the processor 1704 to perform the operations illustrated in FIG. 11, or other operations for performing the various techniques discussed herein. In certain aspects, computer-readable medium/memory 1712 may store code 1714 for outputting, for transmission to a transmitter user equipment (UE), a downlink control information (DCI) allocating resources in an unlicensed frequency band for multiple physical sidelink shared channel (PSSCH) transmissions to at least one receiver UE across transmission time intervals (TTIs); and code 1716 for obtaining at least one LBT report from the transmitter UE on a physical uplink control channel (PUCCH) resource that occurs before another PUCCH resource used for transmitting acknowledgment feedback for the PSSCH transmissions.

In certain aspects, the processor 1704 may have circuitry configured to implement the code stored in the computer-readable medium/memory 1712. The processor 1704 may include circuitry 1720 for outputting, for transmission to a transmitter user equipment (UE), a downlink control information (DCI) allocating resources in an unlicensed frequency band for multiple physical sidelink shared channel (PSSCH) transmissions to at least one receiver UE across transmission time intervals (TTIs); and/or circuitry 1722 for obtaining at least one LBT report from the transmitter UE on a physical uplink control channel (PUCCH) resource that occurs before another PUCCH resource used for transmitting acknowledgment feedback for the PSSCH transmissions.

Example Aspects

In addition to the various aspects described above, aspects of specific combinations are within the scope of the disclosure, some of which are detailed below:

Aspect 1: A method for wireless communications by a transmitter user equipment (UE), comprising: receiving, from a network entity, a downlink control information (DCI) allocating resources in an unlicensed frequency band for multiple physical sidelink shared channel (PSSCH) transmissions to at least one receiver UE across transmission time intervals (TTIs); performing a listen-before-talk (LBT) channel access procedure in the TTIs; and transmitting at least one LBT report to the network entity on a physical uplink control channel (PUCCH) resource that occurs before another PUCCH resource used for transmitting acknowledgment feedback for the PSSCH transmissions.

Aspect 2: The method of Aspect 1, wherein the TTIs comprise slots.

Aspect 3: The method of any one of Aspects 1-2, wherein: the TTIs are divided into LBT groups of contiguous TTIs; and transmitting at least one LBT report comprises transmitting an LBT report for each of the LBT groups on a different PUCCH resource.

Aspect 4: The method of Aspect 3, wherein the DCI indicates, for each of the LBT groups, a scheduling offset relative to a last TTI in that LBT group and a PUCCH resource indicator (PRI).

Aspect 5: The method of Aspect 4, wherein the DCI further indicates: a common scheduling offset and PRI for all of the LBT groups; a common scheduling offset for all of the LBT groups and a separate PRI for each of the LBT groups; or a separate scheduling offset for each of the LBT groups and a common PRI for all of the LBT groups.

Aspect 6: The method of Aspect 3, wherein: each of the LBTs group has a different sidelink assignment index (SAI).

Aspect 7: The method of Aspect 6, wherein the DCI indicates, for each of the LBT groups, an SAI counter value of a first slot in that LBT group.

Aspect 8: The method of Aspect 3, wherein: the report for each of the LBT groups indicates, directly or indirectly, one or more slots in which the LBT procedure failed.

Aspect 9: The method of Aspect 3, wherein: each of the LBT groups comprises a contiguous burst of TTIs; and the report for each of the LBT groups indicates a first TTI in which the LBT procedure passed.

Aspect 10: The method of Aspect 9, further comprising: if a missed DCI is detected, padding bits in an LBT group with values corresponding to a failed LBT procedure.

Aspect 11: The method of any one of Aspects 1-10, further comprising: forwarding the acknowledgment feedback for the PSSCH transmissions to the at least one receiver UE for transmission to the network entity.

Aspect 12: The method of Aspect 3 or Aspect 11, wherein the DCI indicates, for each of the LBT groups, a scheduling offset relative to a last TTI in that LBT group and a PUCCH resource indicator (PRI).

Aspect 13: The method of Aspect 3, wherein the DCI indicates a scheduling offset relative to a last TTI in the particular LBT group and a PRI for the acknowledgment feedback for the PSSCH transmissions.

Aspect 14: A method for wireless communications by a network entity, comprising: transmitting, to a transmitter user equipment (UE), a downlink control information (DCI) allocating resources in an unlicensed frequency band for multiple physical sidelink shared channel (PSSCH) transmissions to at least one receiver UE across transmission time intervals (TTIs); and receiving at least one LBT report from the transmitter UE on a physical uplink control channel (PUCCH) resource that occurs before another PUCCH resource used for transmitting acknowledgment feedback for the PSSCH transmissions.

Aspect 15: The method of Aspect 14, wherein the TTIs comprise slots.

Aspect 16: The method of any one of Aspects 14-15, wherein: the TTIs are divided into LBT groups of contiguous TTIs; and receiving at least one LBT report comprises receiving LBT reports for each of the LBT groups on a different PUCCH resource.

Aspect 17: The method of Aspect 16, wherein the DCI indicates, for each of the LBT groups, an LBT report offset relative to a last TTI in that LBT group and a PUCCH resource indicator (PRI).

Aspect 18: The method of Aspect 17, wherein the DCI further indicates: a common LBT report offset and PRI for all of the LBT groups; a common LBT report offset for all of the LBT groups and a separate PRI for each of the LBT groups; or a separate LBT report offset for each of the LBT groups and a common PRI for all of the LBT groups.

Aspect 19: The method of Aspect 16, wherein: each of the LBTs group has a different sidelink assignment index (SAI).

Aspect 20: The method of Aspect 19, wherein the DCI indicates, for each of the LBT groups, an SAI counter value of a first slot in that LBT group.

Aspect 21: The method of Aspect 16, wherein: the report for each of the LBT groups indicates, directly or indirectly, one or more slots in which the LBT procedure failed.

Aspect 22: The method of Aspect 16, wherein: each of the LBT groups comprises a contiguous burst of TTIs; and the report for each of the LBT groups indicates a first TTI in which the LBT procedure passed.

Aspect 23: The method of Aspect 22, further comprising: if a missed DCI is detected, padding bits in an LBT group with values corresponding to a failed LBT procedure.

Aspect 24: The method of any one of Aspects 14-23, further comprising: forwarding the acknowledgment feedback for the PSSCH transmissions to the at least one receiver UE for transmission to the network entity.

Aspect 25: The method of Aspect 16 or Aspect 24, wherein the DCI indicates, for each of the LBT groups, a LBT report offset relative to a last TTI in that LBT group and a PUCCH resource indicator (PRI).

Aspect 26: The method of Aspect 16, wherein the DCI indicates a LBT report offset relative to a last TTI in the particular LBT group and a PRI for the acknowledgment feedback for the PSSCH transmissions.

Aspect 27: A transmitter user equipment, comprising at least one antenna and means for performing the operations of one or more of Aspects 1-13.

Aspect 28: A transmitter user equipment, comprising a transceiver and a processing system including at least one processor configured to perform the operations of one or more of Aspects 1-13.

Aspect 29: A network entity, comprising at least one antenna and means for performing the operations of one or more of Aspects 14-26.

Aspect 30: A network entity, comprising a transceiver and a processing system including at least one processor configured to perform the operations of one or more of Aspects 14-26.

Aspect 31: An apparatus for wireless communications by a transmitter user equipment (UE), comprising: an interface configured to obtain, from a network entity, a downlink control information (DCI) allocating resources in an unlicensed frequency band for multiple physical sidelink shared channel (PSSCH) transmissions to at least one receiver UE across transmission time intervals (TTIs); and a processing system configured to perform a listen-before-talk (LBT) channel access procedure in the TTIs, wherein the interface is further configured to output at least one LBT report for transmission to the network entity on a physical uplink control channel (PUCCH) resource that occurs before another PUCCH resource used for transmitting acknowledgment feedback for the PSSCH transmissions.

Aspect 32: An apparatus for wireless communications by a network entity, comprising: a processing system configured to generate downlink control information (DCI) allocating resources in an unlicensed frequency band for multiple physical sidelink shared channel (PSSCH) transmissions to at least one receiver UE across transmission time intervals (TTIs); and an interface configured to output, for transmission to a transmitter user equipment (UE), the DCI and obtain at least one LBT report from the transmitter UE on a physical uplink control channel (PUCCH) resource that occurs before another PUCCH resource used for transmitting acknowledgment feedback for the PSSCH transmissions.

Aspect 33: A computer-readable medium for wireless communications by a transmitter UE, comprising codes executable by an apparatus to: obtain, from a network entity, a downlink control information (DCI) allocating resources in an unlicensed frequency band for multiple physical sidelink shared channel (PSSCH) transmissions to at least one receiver UE across transmission time intervals (TTIs); perform a listen-before-talk (LBT) channel access procedure in the TTIs; and output at least one LBT report for transmission to the network entity on a physical uplink control channel (PUCCH) resource that occurs before another PUCCH resource used for transmitting acknowledgment feedback for the PSSCH transmissions.

Aspect 34: A computer-readable medium for wireless communications by a network entity, comprising codes executable by an apparatus to: output, for transmission to a transmitter user equipment (UE), a downlink control information (DCI) allocating resources in an unlicensed frequency band for multiple physical sidelink shared channel (PSSCH) transmissions to at least one receiver UE across transmission time intervals (TTIs); and obtain at least one LBT report from the transmitter UE on a physical uplink control channel (PUCCH) resource that occurs before another PUCCH resource used for transmitting acknowledgment feedback for the PSSCH transmissions.

The techniques described herein may be used for various wireless communications technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a BS or UE may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 1000 of FIG. 10 and operations 1100 of FIG. 11.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for padding, means for performing, means for detecting. means for forwarding and means for allocating may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a transmitter user equipment (UE), comprising:
receiving, from a network entity, a downlink control information (DCI) allocating resources in an unlicensed frequency band for multiple physical sidelink shared channel (PSSCH) transmissions to at least one receiver UE across transmission time intervals (TTIs);
performing a listen-before-talk (LBT) channel access procedure in the TTIs; and
transmitting at least one LBT report to the network entity on a physical uplink control channel (PUCCH) resource that occurs before another PUCCH resource used for transmitting acknowledgment feedback for the PSSCH transmissions.

2. The method of claim 1, wherein the TTIs comprise slots.

3. The method of claim 1, wherein:
the TTIs are divided into LBT groups of contiguous TTIs; and
transmitting at least one LBT report comprises transmitting an LBT report for each of the LBT groups on a different PUCCH resource.

4. The method of claim 3, wherein the DCI indicates, for each of the LBT groups, a scheduling offset relative to a last TTI in that LBT group and a PUCCH resource indicator (PRI).

5. The method of claim 4, wherein the DCI further indicates:
a common scheduling offset and PRI for all of the LBT groups;
a common scheduling offset for all of the LBT groups and a separate PRI for each of the LBT groups; or a separate scheduling offset for each of the LBT groups and a common PRI for all of the LBT groups.

6. The method of claim 3, wherein:
each of the LBTs group has a different sidelink assignment index (SAI).

7. The method of claim 6, wherein the DCI indicates, for each of the LBT groups, an SAI counter value of a first slot in that LBT group.

8. The method of claim 3, wherein:
the report for each of the LBT groups indicates, directly or indirectly, one or more slots in which the LBT procedure failed.

9. The method of claim 3, wherein:
each of the LBT groups comprises a contiguous burst of TTIs; and
the report for each of the LBT groups indicates a first TTI in which the LBT procedure passed.

10. The method of claim 9, further comprising:
if a missed DCI is detected, padding bits in an LBT group with values corresponding to a failed LBT procedure.

11. The method of claim 1, further comprising:
forwarding the acknowledgment feedback for the PSSCH transmissions to the at least one receiver UE for transmission to the network entity.

12. The method of claim 3, wherein the DCI indicates, for each of the LBT groups, a scheduling offset relative to a last TTI in that LBT group and a PUCCH resource indicator (PRI).

13. The method of claim 3, wherein the DCI indicates a scheduling offset relative to a last TTI in the particular LBT group and a PRI for the acknowledgment feedback for the PSSCH transmissions.

14. A method for wireless communications by a network entity, comprising:
transmitting, to a transmitter user equipment (UE), a downlink control information (DCI) allocating resources in an unlicensed frequency band for multiple physical sidelink shared channel (PSSCH) transmissions to at least one receiver UE across transmission time intervals (TTIs); and
receiving at least one LBT report from the transmitter UE on a physical uplink control channel (PUCCH) resource that occurs before another PUCCH resource used for transmitting acknowledgment feedback for the PSSCH transmissions.

15. The method of claim 14, wherein the TTIs comprise slots.

16. The method of claim 14, wherein:
the TTIs are divided into LBT groups of contiguous TTIs; and
receiving at least one LBT report comprises receiving LBT reports for each of the LBT groups on a different PUCCH resource.

17. The method of claim 16, wherein the DCI indicates, for each of the LBT groups, an LBT report offset relative to a last TTI in that LBT group and a PUCCH resource indicator (PRI).

18. The method of claim 17, wherein the DCI further indicates:
a common LBT report offset and PRI for all of the LBT groups;
a common LBT report offset for all of the LBT groups and a separate PRI for each of the LBT groups; or
a separate LBT report offset for each of the LBT groups and a common PRI for all of the LBT groups.

19. The method of claim 16, wherein:
each of the LBTs group has a different sidelink assignment index (SAI).

20. The method of claim 19, wherein the DCI indicates, for each of the LBT groups, an SAI counter value of a first slot in that LBT group.

21. The method of claim 16, wherein:
the report for each of the LBT groups indicates, directly or indirectly, one or more slots in which the LBT procedure failed.

22. The method of claim 16, wherein:
each of the LBT groups comprises a contiguous burst of TTIs; and
the report for each of the LBT groups indicates a first TTI in which the LBT procedure passed.

23. The method of claim 22, further comprising:
if a missed DCI is detected, padding bits in an LBT group with values corresponding to a failed LBT procedure.

24. The method of claim 16, further comprising:
forwarding the acknowledgment feedback for the PSSCH transmissions to the at least one receiver UE for transmission to the network entity.

25. The method of claim 24, wherein the DCI indicates, for each of the LBT groups, a LBT report offset relative to a last TTI in that LBT group and a PUCCH resource indicator (PRI).

26. The method of claim 16, wherein the DCI indicates a LBT report offset relative to a last TTI in the particular LBT group and a PRI for the acknowledgment feedback for the PSSCH transmissions.

27. A transmitter user equipment (UE), comprising:
a receiver configured to receive, from a network entity, a downlink control information (DCI) allocating resources in an unlicensed frequency band for multiple physical sidelink shared channel (PSSCH) transmissions to at least one receiver UE across transmission time intervals (TTIs);
a processing system configured to perform a listen-before-talk (LBT) channel access procedure in the TTIs; and
a transmitter configured to transmit at least one LBT report to the network entity on a physical uplink control channel (PUCCH) resource that occurs before another PUCCH resource used for transmitting acknowledgment feedback for the PSSCH transmissions.

28. The transmitter UE of claim 27, wherein, at least one of:
the TTIs are divided into LBT groups of contiguous TTIs;
the transmission of the at least one LBT report comprises transmitting an LBT report for each of the LBT groups on a different PUCCH resource; or
the report for each of the LBT groups indicates, directly or indirectly, one or more slots in which the LBT procedure failed.

29. A network entity, comprising:
a transmitter configured to transmit, to a transmitter user equipment (UE), a downlink control information (DCI) allocating resources in an unlicensed frequency band for multiple physical sidelink shared channel (PSSCH) transmissions to at least one receiver UE across transmission time intervals (TTIs); and
a receiver configured to receive at least one LBT report from the transmitter UE on a physical uplink control channel (PUCCH) resource that occurs before another PUCCH resource used for transmitting acknowledgment feedback for the PSSCH transmissions.

30. The method of claim 29, wherein, at least one of:
the TTIs are divided into LBT groups of contiguous TTIs and the reception of the at least one LBT report comprises receiving LBT reports for each of the LBT groups on a different PUCCH resource;

the DCI indicates, for each of the LBT groups, an LBT report offset relative to a last TTI in that LBT group and a PUCCH resource indicator (PRI);

a common LBT report offset and PRI for all of the LBT groups;

the DCI indicates a common LBT report offset for all of the LBT groups and a separate PRI for each of the LBT groups; or the DCI indicates a separate LBT report.

* * * * *